United States Patent
Tanaka

(10) Patent No.: US 9,819,853 B2
(45) Date of Patent: Nov. 14, 2017

(54) IMAGING DEVICE AND FOCUSING CONTROL METHOD

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/233,621

(22) Filed: Aug. 10, 2016

(65) Prior Publication Data
US 2016/0353010 A1 Dec. 1, 2016

Related U.S. Application Data

(63) Continuation of application No. PCT/JP2014/082796, filed on Dec. 11, 2014.

(30) Foreign Application Priority Data

Mar. 18, 2014 (JP) .................................. 2014-054993

(51) Int. Cl.
*H04N 5/232* (2006.01)
*G03B 13/00* (2006.01)
(Continued)

(52) U.S. Cl.
CPC ........... *H04N 5/23212* (2013.01); *G02B 7/34* (2013.01); *G03B 13/36* (2013.01); *H04N 5/3656* (2013.01); *H04N 5/3696* (2013.01); *H04N 9/045* (2013.01)

(58) Field of Classification Search
CPC ............. H04N 5/23212; H04N 5/3656; H04N 5/3696; H04N 9/045; G02B 7/34; G03B 13/36
(Continued)

(56) References Cited

U.S. PATENT DOCUMENTS

| | | | |
|---|---|---|---|
| 8,830,379 B2 * | 9/2014 | Kato | H04N 5/23212 348/345 |
| 2011/0102663 A1 * | 5/2011 | Ichimiya | G02B 7/36 348/345 |

(Continued)

FOREIGN PATENT DOCUMENTS

| | | |
|---|---|---|
| JP | 2010-152161 A | 7/2010 |
| JP | 2011-109576 A | 6/2011 |

(Continued)

OTHER PUBLICATIONS

English translation of the International Preliminary Report on Patentability, dated Sep. 2, 2016, for International Application No. PCT/JP2014/082796.

(Continued)

*Primary Examiner* — Tuan Ho
*Assistant Examiner* — Zhenzhen Wu
(74) *Attorney, Agent, or Firm* — Birch, Stewart, Kolasch & Birch, LLP

(57) ABSTRACT

A phase difference AF processing unit (19) compares subject images between a region R1 and a region Rj (j=2 to m) in an AF area (53), and determines a phase difference detection pixel (52A, 52B) as a detection signal addition target with respect to a phase difference detection pixel (52A, 52B) in the region R1 among phase difference detection pixels (52A, 52B) in the region Rj. Further, the phase difference AF processing unit (19) adds up detection signals with respect to the phase difference detection pixels (52A, 52B) in the region R1 and the phase difference detection pixels (52A, 52B) which are addition targets, and generates a defocus amount (Df1) from a result of a correlation operation using detection signals after addition. A system control unit (11) drives a focus lens according to the defocus amount (Df1) to perform a focusing control.

20 Claims, 12 Drawing Sheets

(51) Int. Cl.
*G02B 7/34* (2006.01)
*G03B 13/36* (2006.01)
*H04N 9/04* (2006.01)
*H04N 5/365* (2011.01)
*H04N 5/369* (2011.01)

(58) Field of Classification Search
USPC .................................................. 348/345, 349
See application file for complete search history.

(56) References Cited

U.S. PATENT DOCUMENTS

| | | | |
|---|---|---|---|
| 2013/0071036 A1* | 3/2013 | Suzuki | H04N 5/23232 382/218 |
| 2014/0198239 A1* | 7/2014 | Suzuki | H04N 5/23212 348/246 |
| 2014/0211059 A1 | 7/2014 | Aoki | |

FOREIGN PATENT DOCUMENTS

| | | |
|---|---|---|
| JP | 2011-135191 A | 7/2011 |
| JP | 2013-66114 A | 4/2013 |
| WO | WO 2012/073727 A1 | 6/2012 |
| WO | WO 2013/047160 A1 | 4/2013 |

OTHER PUBLICATIONS

International Preliminary Report on patentability for PCT/JP2014/082796 (PCT/IPEA/409) dated Apr. 6, 2016.
International Search Report for PCT/JP2014/082796 dated Mar. 17, 2015.
Written Opinion of the International Searching Authority for PCT/JP2014/082796 (PCT/ISA/237) dated Mar. 17, 2015.

* cited by examiner

IMAGING DEVICE AND FOCUSING CONTROL METHOD

CROSS-REFERENCE TO RELATED APPLICATIONS

This application is a Continuation of PCT International Application No. PCT/JP2014/082796 filed on Dec. 11, 2014, which claims priority under 35 U.S.C. §119(a) to Japanese Patent Application No. 2014-054993 filed on Mar. 18, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for information devices having an imaging function, such as a digital still camera, a digital video camera, a mobile phone such as a smart phone, or a personal digital assistant (PDA) has rapidly increased. Such an information device having an imaging function is referred to as an imaging device.

In such an imaging device, as a focusing control method for focusing on a main subject, a phase difference auto-focus (AF) method (for example, see JP2011-135191A, and JP2010-152161A) is employed.

In a solid-state imaging element mounted on an imaging device that performs a focusing control based on the phase difference AF method, a configuration in which pairs of phase difference detection pixels in which light shielding film openings are eccentric in opposite directions are discretely arranged on an entire imaging surface is used.

Such a phase difference detection pixel has a low sensitivity compared with that of a normal imaging pixel in which a light shielding film opening is not eccentric with respect to a photoelectric conversion unit. Thus, in a case where a subject has a low luminous intensity, a detection signal level of the phase difference detection pixel is lowered. In order to compensate for the reduction in the detection signal level, if a correlation operation is performed merely through a gain-up process, an error occurs in a result of the correlation operation. Accordingly, a process of increasing a signal level by adding up detection signals of phase difference detection pixels is performed.

JP2011-135191A discloses a configuration in which detection signals of plural phase difference detection pixels which are diagonally arranged are added up and a correlation operation is performed using detection signals after addition to generate a defocus amount.

Further, JP2010-152161A discloses a configuration in which detection signals of plural phase difference detection pixels which are arranged at the same horizontal positions are added up and a defocus amount is generated based on detection signals after addition.

SUMMARY OF THE INVENTION

In all of the imaging devices disclosed in JP2011-135191A and JP2010-152161A, detection signals of plural phase difference detection pixels which are arranged in a specific direction are added up, and a correlation operation is performed using detection signals after addition. However, there is a case where a bright subject portion is image-formed in a part of plural phase difference detection pixels and a dark subject portion is image-formed in the other part of the plural phase difference detection pixels, that is, a case where an edge of a subject is present in a crossing pattern in a specific direction. In this case, since the edge becomes blurred due to addition of detection signals, an error occurs in a result of a correlation operation of detection signals after addition.

In order to solve the above-mentioned problems, an object of the invention is to provide an imaging device and a focusing control method capable of enhancing accuracy of a focusing control regardless of subjects even when levels of detection signals of phase difference detection pixels are low.

According to an aspect of the invention, there is provided an imaging device comprising: an imaging element that includes pairs of a first signal detection unit that detects a signal corresponding to a beam that passes through a divided region among two divided regions of a pupil region divided in a direction in an imaging optical system and a second signal detection unit that detects a signal corresponding to a beam that passes through the other divided region, and includes an imaging surface in which regions where the plurality of first signal detection units and the plurality of second signal detection units that forms pairs in combination with the first signal detection units are arranged in the direction are arranged in a direction orthogonal to the direction; an addition target determination unit that determines, with respect to each of the plurality of first signal detection units in an arbitrary region among the plurality of regions, arranged in the direction orthogonal to the direction, the first signal detection unit as a detection signal addition target in each region other than the arbitrary region and determines, with respect to the second signal detection unit that forms a pair in combination with each of the plurality of first signal detection units, the second signal detection unit as a detection signal addition target in each region other than the arbitrary region through comparison of subject images formed in the plurality of respective regions; a defocus amount generation unit that performs a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generates a first defocus amount from a result of the correlation operation; and a focusing control unit that performs a focusing control for the imaging optical system based on the first defocus amount.

According to the other aspect of the invention, there is provided a focusing control method of an imaging device including an imaging element that includes pairs of a first signal detection unit that detects a signal corresponding to a beam that passes through a divided region among two divided regions of a pupil region divided in a direction in an imaging optical system and a second signal detection unit that detects a signal corresponding to a beam that passes through the other divided region, includes an imaging surface in which regions where the plurality of first signal detection units and the plurality of second signal detection units that forms pairs in combination with the first signal detection units are arranged in the direction are arranged in a direction orthogonal to the direction, and images a subject through the imaging optical system, the method comprising: an addition target determination step of determining, with respect to each of the plurality of first signal detection units in an arbitrary region among the plurality of regions, arranged in the direction orthogonal to the direction, the first signal detection unit as a detection signal addition target in each region other than the arbitrary region and determining, with respect to the second signal detection unit that forms a pair in combination with each of the plurality of first signal detection units, the second signal detection unit as a detection signal addition target in each region other than the arbitrary region, through comparison of subject images formed in the plurality of respective regions; a defocus amount generation step of performing a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generating a first defocus amount from a result of the correlation operation; and a focusing control step of performing a focusing control for the imaging optical system based on the first defocus amount.

According to the invention, it is possible to provide an imaging device and a focusing control method capable of enhancing accuracy of a focusing control regardless of subjects even when levels of detection signals of phase difference detection pixels are low.

DESCRIPTION OF THE PREFERRED EMBODIMENTS

Hereinafter, embodiments of the invention will be described with reference to the accompanying drawings.

Figure 1:
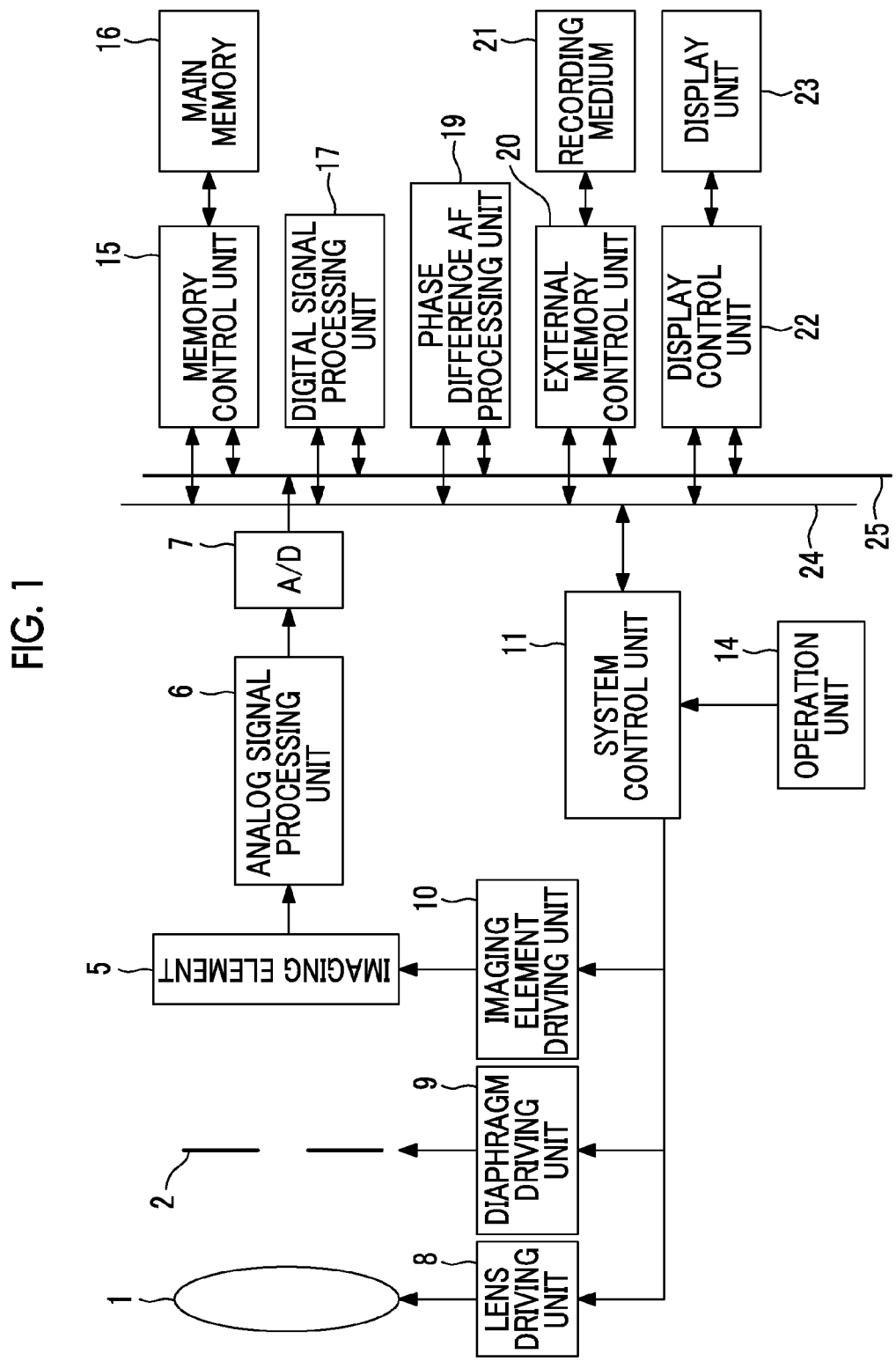
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device shown in FIG. 1 is fixed to a camera main body, but may be exchanged with another lens device. The imaging lens 1 may include at least the focus lens. And the focus lens may be a single focus lens that performs focus adjustment by moving the entirety of the lens system.

The digital camera includes an imaging element 5 of a CCD type, a CMOS type, or the like that images a subject through the lens device, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 as a captured image signal. An instruction signal from a user is input to the system control unit 11 through an operation unit 14. The instruction signal includes an instruction signal for instructing execution of a focusing control of the imaging optical system.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19, an external memory control unit 20 to which a detachable and attachably recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
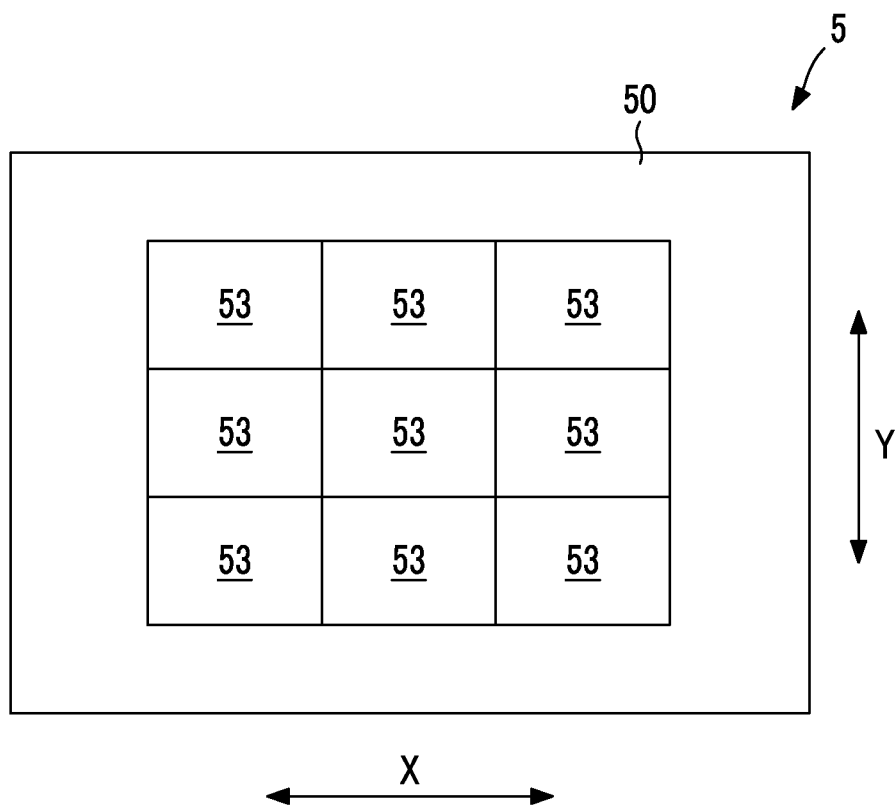
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which multiple pixels which are arranged in a two-dimensional pattern in an X direction and in a Y direction orthogonal to the X direction. In the example of FIG. 2, nine AF areas 53 which are target areas for focusing are provided on the imaging surface 50.

The AF area 53 is an area that includes an imaging pixel and a phase difference detection pixel as pixels.

In a portion where the AF areas 53 are excluded on the imaging surface 50, only imaging pixels are disposed. The AF areas 53 may be provided on the imaging surface 50 without a gap.

Figure 3:
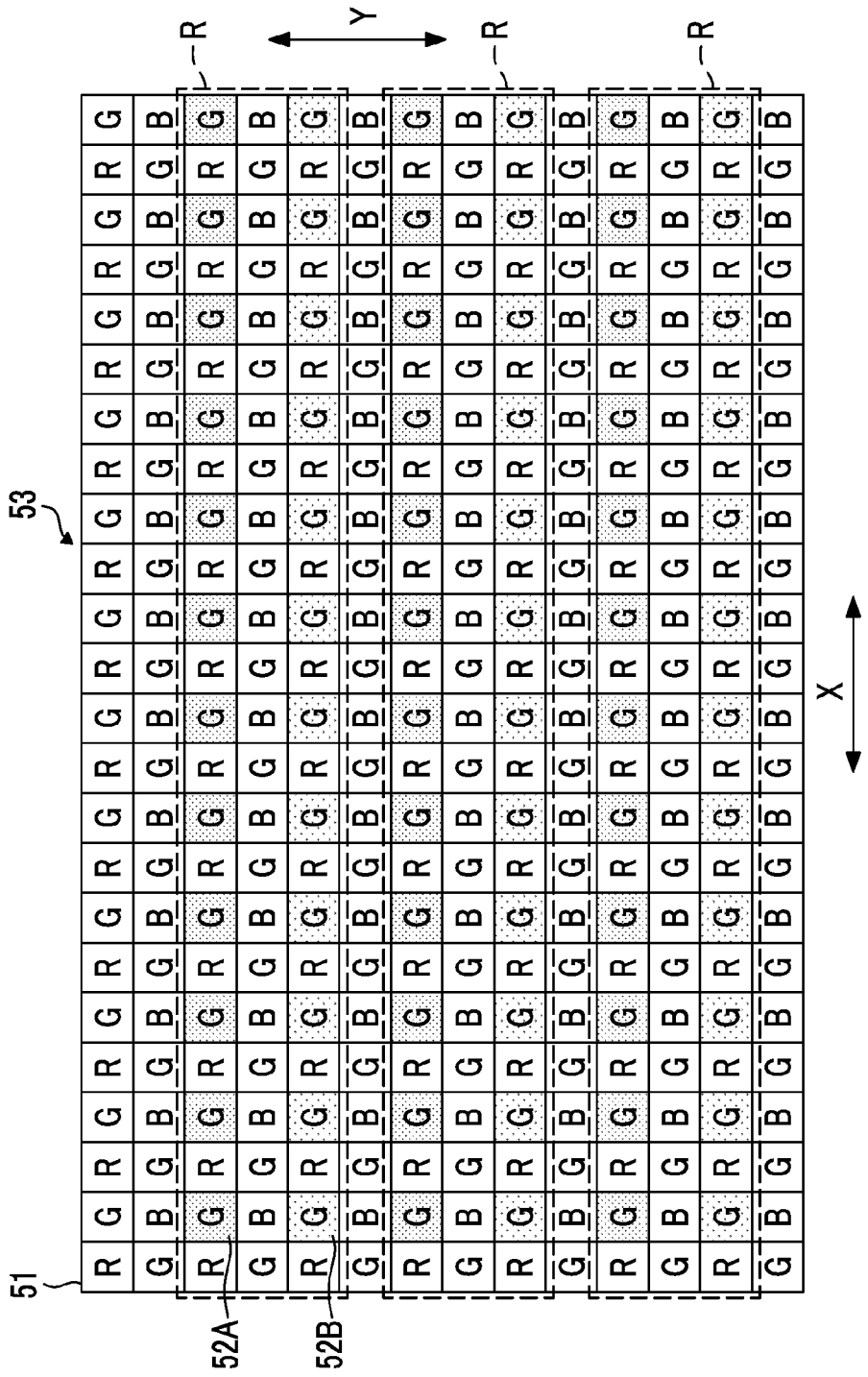
FIG. 3 is a partially enlarged view illustrating a single AF area 53 shown in FIG. 2.

FIG. 3 is a partially enlarged view illustrating a single AF area 53 shown in FIG. 2.

Pixels 51 (square shaped blocks in the figure) are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The color filters are arranged in the form of a Bayer array over the entirety of the imaging surface 50.

In the AF area 53, a part of the G pixels 51 (shaded pixels in FIG. 3) are used as the phase difference detection pixels 52A and 52B. In the example of FIG. 3, each G pixel 51 in an arbitrary pixel row among pixel rows including the R pixels 51 and the G pixels 51 is used as the phase difference detection pixel 52A. Further, the G pixel 51 of the same color closest to each G pixel 51 in the column direction Y is used as the phase difference detection pixel 52B. The phase difference detection pixel 52A and the phase difference detection pixel 52B of the same color closest to the phase difference detection pixel 52A form a pair.

Figure 4:
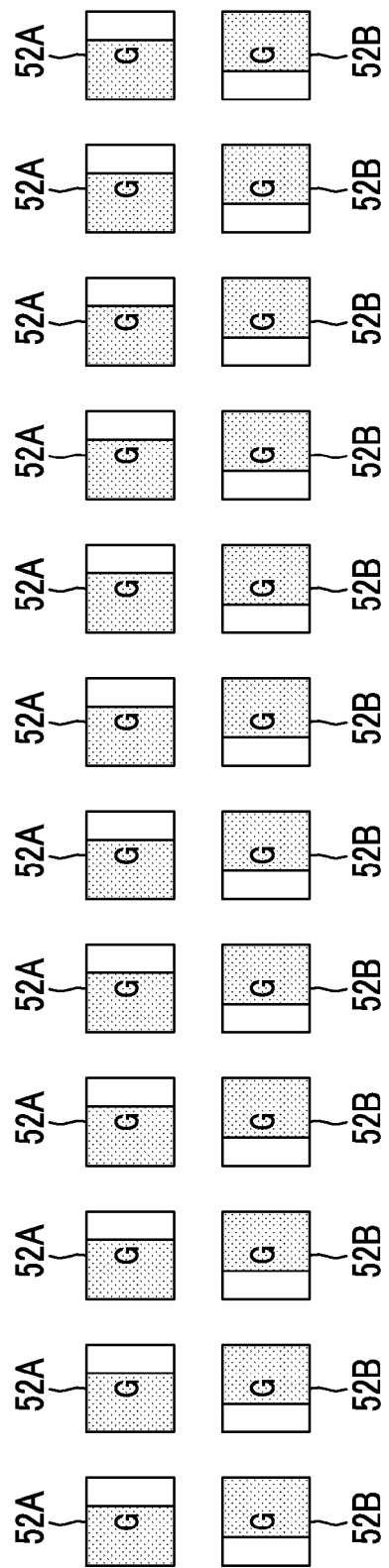
FIG. 4 is a diagram illustrating only phase difference detection pixels 52A and 52B shown in FIG. 3.

FIG. 4 is a diagram illustrating plural pairs arranged in the X direction shown in FIG. 3.

The phase difference detection pixel 52A is a first signal detection unit that receives a beam that passes through one divided region in a pupil region of the imaging lens 1, divided in one direction (the X direction in the example of FIG. 3), and detects a signal depending on the intensity of received light.

The phase difference detection pixel 52B is a second signal detection unit that receives a beam that passes through the other divided region in the pupil region of the imaging lens 1 and detects a signal depending on the intensity of received light.

In the AF area 53, plural pixels 51 other than the phase difference detection pixels 52A and 52B are imaging pixels. Each imaging pixel is a third signal detection unit that receives beams that pass through the two divided regions in the pupil region of the imaging lens 1, and detects a signal depending on the intensity of received light.

As shown in FIG. 3, in the AF area 53, plural regions R in which plural phase difference detection pixels 52A arranged in the X direction and phase difference detection pixels 52B that form pairs in combination with the respective plural phase difference detection pixels 52A are arranged are arranged in the Y direction. In each region R, a pixel line including only the imaging pixels 51 is disposed between a pixel line including the phase difference detection pixels 52A and a pixel line including the phase difference detection pixels 52B.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
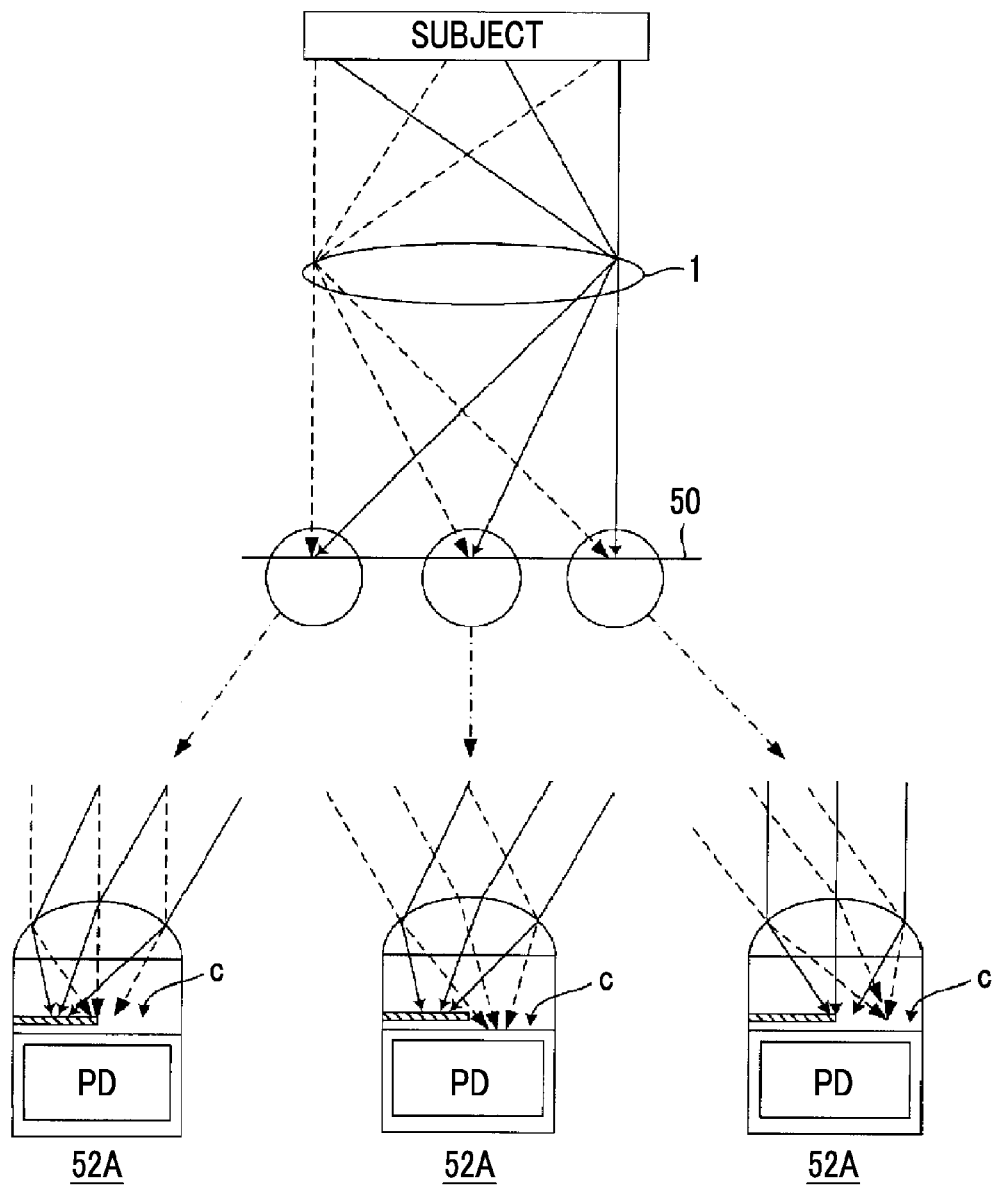
FIG. 5 is a diagram illustrating a sectional configuration of the phase difference detection pixels 52A shown in FIG. 3.

FIG. 5 is a diagram illustrating a sectional configuration of the phase difference pixel 52A. As shown in FIG. 5, an opening c of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit is covered by the light shielding film.

With such a configuration, it is possible to detect, using a pixel group that includes the phase difference detection pixels 52A which are positioned in an arbitrary row and a pixel group that includes the phase difference detection pixels 52B which are disposed at the same distance in one direction with respect to each of the phase difference detection pixels 52A of the former pixel group, a phase difference in the row direction X in images respectively captured by the two pixel groups.

The phase difference AF processing unit 19 shown in FIG. 1 generates a defocus amount using any one method of the following two methods according to the brightness of a subject. The phase difference AF processing unit 19 functions as a defocus amount generation unit.

(First Method)

The phase difference AF processing unit 19 performs a correlation operation with respect to detection signal groups of the phase difference detection pixels 52A and the phase difference detection pixels 52B for each region R in one selected AF area 53 from nine AF areas 53 through a user operation, and calculates a phase difference which is a relative deviation amount between an image captured by the phase difference detection pixels 52A and an image captured by the phase difference detection pixels 52B.

The phase difference AF processing unit 19 generates a defocus amount Dfr which is a movement value of the focus lens necessary for matching an image formation surface of a main subject and the imaging surface 50 of the imaging element 5 by the imaging lens 1, based on the phase difference. The phase difference AF processing unit 19 calculates an average of the defocus amounts Dfr calculated with respect to respective regions R, and notifies the system control unit 11 of a defocus amount Df obtained by averaging the defocus amounts Dfr.

(Second Method)

The phase difference AF processing unit 19 determines a phase difference detection pixel 52A as an addition target of a detection signal in each region R other than the arbitrary region R, with respect to each of the plural phase difference detection pixels 52A disposed in an arbitrary region R in a selected AF area 53. Further, the phase difference AF processing unit 19 determines a phase difference detection pixel 52B as an addition target of a detection signal in each region R other than the arbitrary region R, with respect to each of the plural phase difference detection pixels 52B that form a pair in combination with each of the plural phase difference detection pixels 52A disposed in the arbitrary region. The phase difference AF processing unit 19 functions as an addition target determination unit.

The phase difference AF processing unit 19 adds up a detection signal of each of the plural phase difference detection pixels 52A in the arbitrary region R and a detection signal of the plural phase difference detection pixel 52A in the region R other than the arbitrary region R, determined as the addition target with respect to each of the plural phase difference detection pixels 52A in the arbitrary region R. Further, the phase difference AF processing unit 19 adds up a detection signal of each of the plural phase difference detection pixels 52B in the arbitrary region R and a detection signal of the plural phase difference detection pixel 52B in the region R other than the arbitrary region R, determined as the addition target with respect to each of the plural phase difference detection pixels 52B in the arbitrary region R. Furthermore, the phase difference AF processing unit 19 performs a correlation operation with respect to a detection signal group of the phase difference detection pixels 52A after addition and a detection signal group of the phase difference detection pixels 52B after addition, generates a first defocus amount Df1 from the result of the correlation operation, and notifies the system control unit 11 of the first defocus amount Df1.

A method for determining an addition target pixel by the phase difference AF processing unit 19 will be ally described with reference to FIG. 6.

Figure 6:
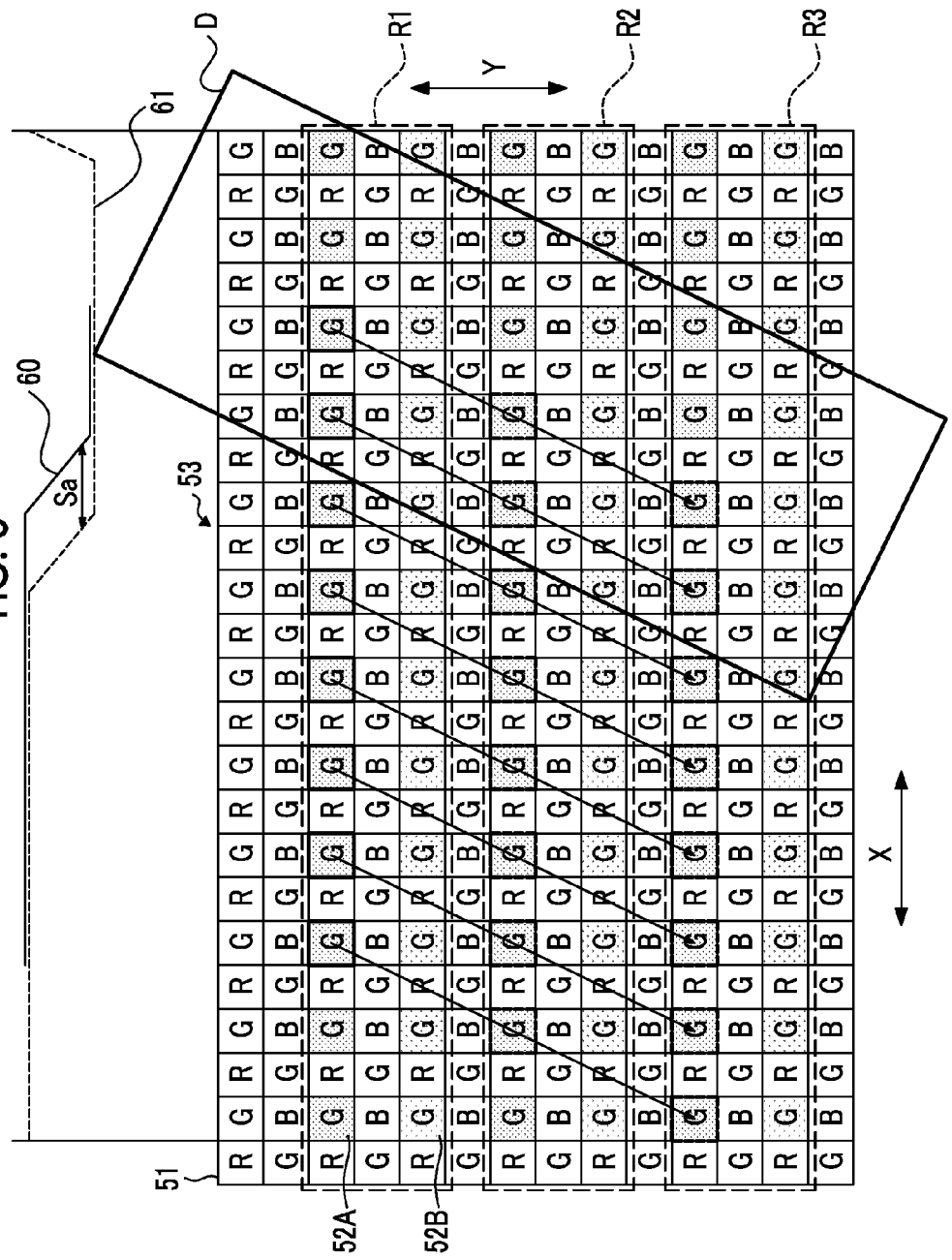
FIG. 6 is a diagram illustrating a method for determining addition target pixels.

In FIG. 6, the AF area 53 shown in FIG. 3 is shown. In FIG. 6, a top region among three regions R disposed in the AF area 53 is referred to as a region R1, a middle region is referred to as a region R2, and a bottom region is referred to as a region R3. In FIG. 6, a method for determining phase difference detection pixels 52A as addition targets of detection signals in the respective regions R2 an R3 other than the region R1 with respect to eight phase difference detection pixels 52A surrounded by a thick line in the arbitrary region R1 will be described.

The phase difference AF processing unit 19 compares a first subject image formed in the region R1 with a second subject image formed in the region R2.

In FIG. 6, a detection signal waveform of the eight phase difference detection pixels 52A surrounded by the thick line in the region R1 is indicated by reference numeral 60. Further, a detection signal waveform of all the phase difference detection pixels 52A in the region R2 is indicated by reference numeral 61. In the waveforms indicated by reference numerals 60 and 61, a transverse axis represents positions of the phase difference detection pixels 52A.

In FIG. 6, the detection signal waveform 60 and the detection signal waveform 61 are slightly shifted in the Y direction, but in reality, the shift is not present. Further, in FIG. 6, a portion having a low luminance in a subject to be image-formed on an imaging surface is indicated by reference sign D. A boundary between this portion D and other portions becomes an edge of the subject.

Here, the detection signal waveform 60 corresponds to the first subject image formed in the region R1. Further, the detection signal waveform 61 corresponds to the second subject image formed in the region R2. Thus, the phase difference AF processing unit 19 performs matching of the detection signal waveform 60 and the detection signal waveform 61 to determine addition targets.

ally, in the detection signal waveforms 60 and 61, the phase difference AF processing unit 19 calculates differences between detection signals of pixels of which positions in the X direction are the same, and calculates an integrated value of these differences. The phase difference AF processing unit 19 calculates the integrated value of the differences in the same way at the respective positions while shifting the position of each detection signal of the detection signal waveform 60 in the X direction one by one.

Further, the phase difference AF processing unit 19 generates a shift amount Sa (distance corresponding to two pixels in the example shown in the figure) of the detection signal waveform 60 in the X direction when the integrated value becomes a minimum. The shift amount Sa becomes a shift amount of the first subject image in the X direction necessary for maximizing a matching degree of the first subject image formed in the region R1 and the second subject image formed in the region R2.

The phase difference AF processing unit 19 similarly performs matching between the detection signal waveform 60 and a detection signal waveform of all the phase difference detection pixels 52A in the region R3, and generates a shift amount Sb of the first subject image in the X direction necessary for maximizing a matching degree of the first subject image formed in the region R1 and the second subject image formed in the region R3.

The phase difference AF processing unit 19 sets a phase difference detection pixel 52A (pixel surrounded by a dotted line in FIG. 6) at a position shifted by the shift amount Sa in the X direction with respect to each of eight phase difference detection pixels 52A surrounded by a thick frame in the region R1 among the phase difference detection pixels 52A in the region R2 as an addition target.

Further, the phase difference AF processing unit 19 sets a phase difference detection pixel 52B (pixel disposed below the phase difference detection pixels 52A surrounded by a dotted line in FIG. 6) at a position shifted by the shift amount Sa in the X direction with respect to the phase difference detection pixel 52B that forms a pair in combination with each of the eight phase difference detection pixels 52A surrounded by a thick frame in the region R1 among the phase difference detection pixels 52B in the region R2 as an addition target.

Similarly, the phase difference AF processing unit 19 sets a phase difference detection pixel 52A (pixel surrounded by a dotted line in FIG. 6) at a position shifted by the shift amount Sb in the X direction with respect to each of eight phase difference detection pixels 52A surrounded by a thick frame in the region R1 among the phase difference detection pixels 52A in the region R3 as an addition target.

Further, the phase difference AF processing unit 19 sets a phase difference detection pixel 52B (pixel disposed below the phase difference detection pixels 52A surrounded by a dotted line in FIG. 6) at a position shifted by the shift amount Sb in the X direction with respect to the phase difference detection pixel 52B that forms a pair in combination with each of the eight phase difference detection pixels 52A surrounded by a thick frame in the region R1 among the phase difference detection pixels 52B in the region R3 as an addition target.

Through such a process, the added detection signals of the plural phase difference detection pixels 52A (52B) all become signals having a high luminance or a low luminance. Thus, an edge becomes blurred due to addition, and thus, it is possible to prevent an error in a result of a correlation operation.

Figure 7:
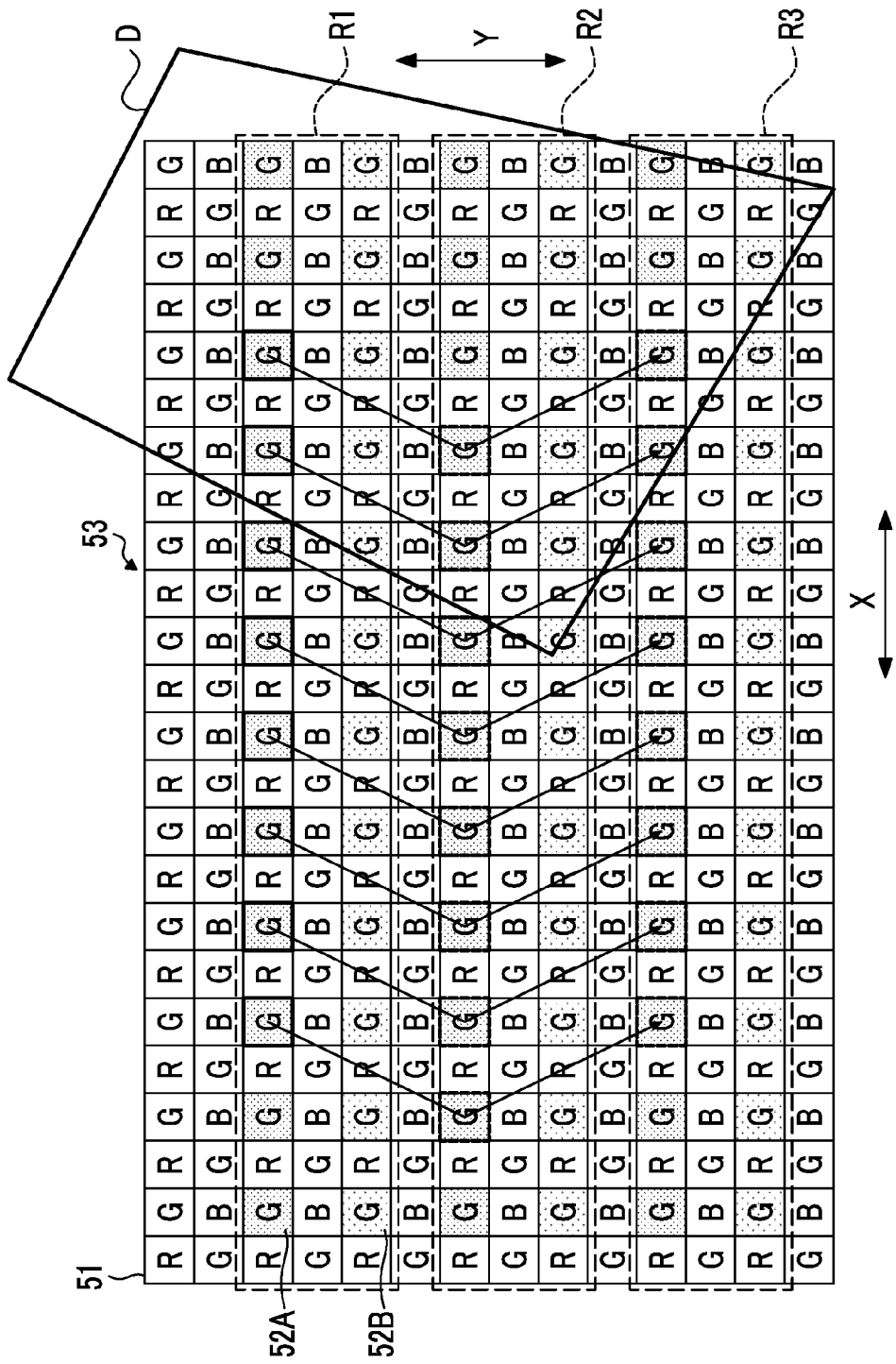
FIG. 7 is a diagram illustrating a modification example of an edge D shown in FIG. 6.

Further, by determining addition target pixels by performing matching (comparison of subject images) in the region R1 and the region R2 and matching (comparison of subject images) in the region R1 and the region R3, even in a case where an edge of which a direction varies on the way in the AF area 53 is present as shown in FIG. 7, it is possible to perform addition along the shape of the edge. Accordingly, it is possible to prevent an error from occurring in a correlation operation result.

In FIGS. 6 and 7, the number of phase difference detection pixels 52A which becomes a reference for determining addition targets is set to be smaller than that of all the phase difference detection pixels 52A in the region R1. This is because in a case where the addition is performed in a diagonal direction, if all the phase difference detection pixels 52A in the region R1 are used as references, an addition destination is not present with respect to a phase difference detection pixel 52A disposed in an end portion in the X direction.

Returning to FIG. 1, the system control unit 11 drives the focus lens according to the defocus amount Df or a first defocus amount Df1 notified from the phase difference AF processing unit 19, and performs a focusing control of the imaging optical system. The system control unit 11 functions as a focusing control unit.

Hereinafter, an operation of the digital camera in FIG. 1 will be described.

Figure 8:
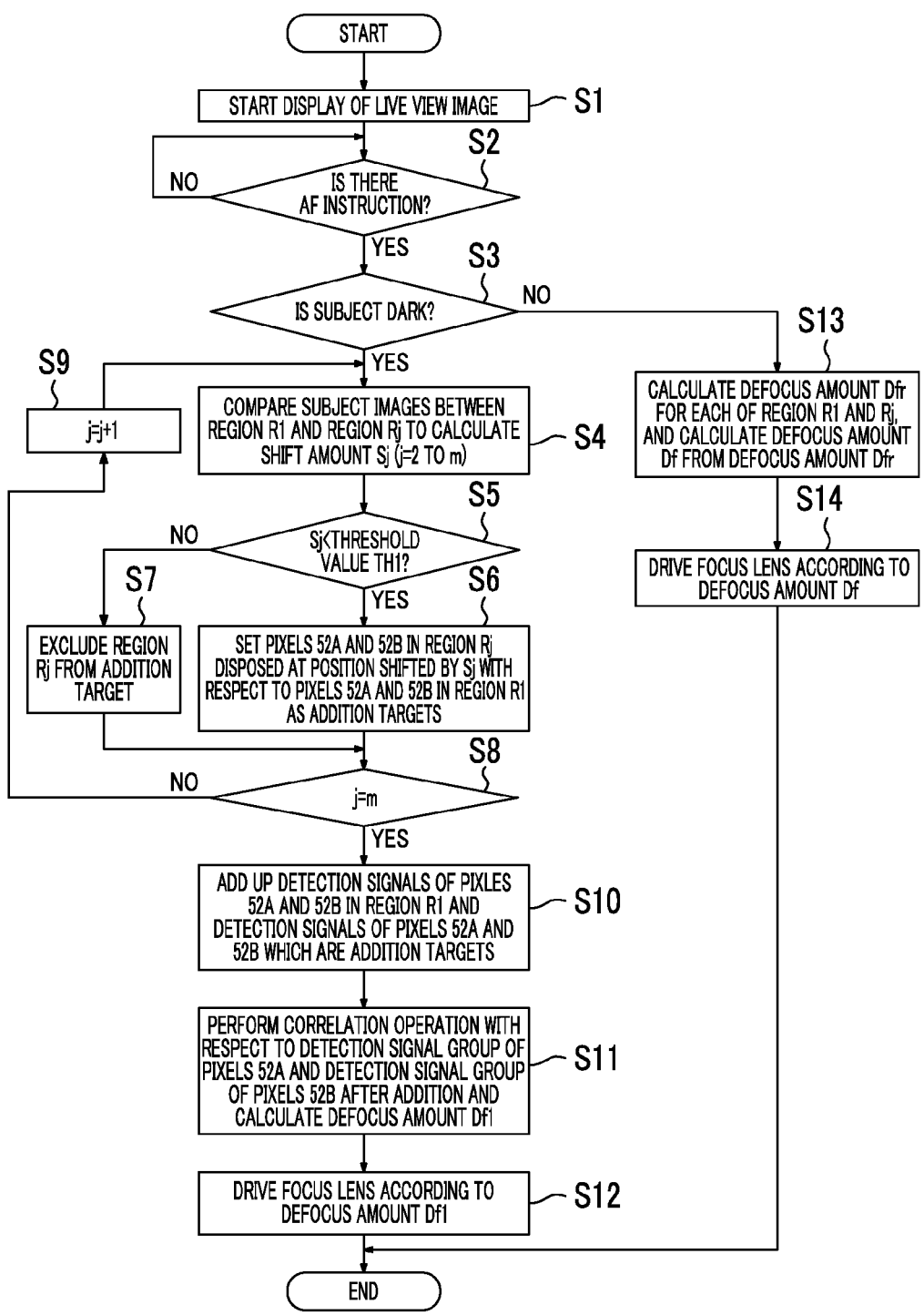
FIG. 8 is a flowchart illustrating an auto-focus operation of the digital camera shown in FIG. 1.

FIG. 8 is a diagram illustrating an operation of the digital camera shown in FIG. 1. Hereinafter, in a selected AF area 53, regions R arranged in the Y direction are referred to as R1, R2, . . . , and Rm (m is a natural number of 2 or more) in the order from an end portion.

If the digital camera is set to an imaging mode, the system control unit 11 starts display of a live view image (step S1).

ally, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the system control unit 11 determines the brightness of a subject imaged by the imaging element 5 using the latest image signals (hereinafter, referred to as captured image signals Ga) among captured image signals obtained when the auto-focus execution instruction is given. For example, the system control unit 11 calculates an average or an integrated value of luminance values of the captured image signals Ga as the brightness.

If the calculated brightness is equal to or smaller than a threshold value (step S3: YES), the system control unit 11 causes the phase difference AF processing unit 19 to perform a process of step S4, and if the calculated brightness exceeds the threshold value (step S3: NO), the system control unit 11 causes the phase difference AF processing unit 19 to perform a process of step S13.

In step S13, the phase difference AF processing unit 19 performs a correlation operation with respect to a detection signal group of the phase difference detection pixels 52A and a detection signal group of the phase difference detection pixels 52B disposed in each of the regions R1 to Rm in a selected AF area 53, among the captured image signals Ga, and generates a defocus amount Dfr with respect to each of the regions R1 to Rm. Further, the phase difference AF processing unit 19 generates an average value of the defocus amounts Dfr as a final defocus amount Df, and notifies the system control unit 11 of the defocus amount Df.

The system control unit 11 moves the focus lens to a focusing position according to the defocus amount Df notified from the phase difference AF processing unit 19 (step S14), and completes auto-focusing.

In step S4, the phase difference AF processing unit 19 compares a subject image formed in the region R1 with a subject image formed in a region Rj (j=2 to m, in which an initial value is 2), and calculates a shift amount Sj of a first subject image in the X direction necessary for maximizing a matching degree of the first subject image formed in the region R1 and a second subject image formed in the region Rj, by the method described in FIG. 6.

Then, the phase difference AF processing unit 19 compares the calculated shift amount Sj with a threshold value TH1. If the shift amount Sj is equal to or greater than the threshold value TH1 (step S5: NO), the phase difference AF processing unit 19 excludes phase difference detection pixels 52A and 52B in the region Rj where the shift amount Sj is calculated from addition targets of detection signals with respect to phase difference detection pixels 52A and 52B in the region R1 (step S7).

If the shift amount Sj is excessively large, detection signals are added up with respect to phase difference detection pixels at a position which is considerably shifted, and thus, a reliability of a defocus amount which is finally calculated is lowered. Thus, in step S7, detection signals in a region where the shift amount Sj is equal to or greater than the threshold value TH1 is excluded from addition targets.

If the shift amount Sj is smaller than the threshold value TH1 (step S5: YES), the phase difference AF processing unit 19 determines the phase difference detection pixel 52A in the region Rj at the position shifted by the shift amount Sj in the X direction with respect to each of the plural phase difference detection pixels 52A in the region R1 as an addition target. Further, the phase difference AF processing unit 19 determines the phase difference detection pixel 52B in the region Rj at the position shifted by the shift amount Sj in the X direction with respect to each of the plural phase difference detection pixels 52B in the region R1 as an addition target (step S6).

After step S6 and step S7, the phase difference AF processing unit 19 determines whether j=m (step S8). If the determination of step S8 is NO, the phase difference AF processing unit 19 sets j to j+1 in step S9, and performs the process of step S4.

If the determination in step S8 is YES, the phase difference AF processing unit 19 adds up detection signals of the phase difference detection pixels 52A in the region R1 and detection signals of the phase difference detection pixels 52A of each of regions R2 to Rm determined as addition targets with respect to the phase difference detection pixels 52A in the region R1. Further, the phase difference AF processing unit 19 adds up detection signals of the phase difference detection pixels 52B in the region R1 and detection signals of the phase difference detection pixels 52B of each of the regions R2 to Rm determined as addition targets with respect to the phase difference detection pixels 52B in the region R1 (step S10).

Then, the phase difference AF processing unit 19 performs a correlation operation with respect to a detection signal group of the phase difference detection pixels 52A and a detection signal group of the phase difference detection pixels 52B, and generates a first defocus amount Df1 from the result of the correlation operation (step S11).

After the first defocus amount Df1 is generated, the first defocus amount Df1 is notified to the system control unit 11. The system control unit 11 drives the focus lens according to the first defocus amount Df1 (step S12), and completes auto-focusing.

As described above, according to the digital camera shown in FIG. 1, even when a subject is dark, since detection signals of phase difference detection pixels 52A (52B) are added up in plural rows and a correlation operation is performed, it is possible to prevent reduction in the accuracy of generation of a defocus amount. Further, since positions of pixels as addition targets are determined for each region R according to a subject pattern, it is possible to enhance the accuracy of generation of a defocus amount.

In description of FIG. 6, in order to calculate a shift amount where a matching degree of subject images that are respectively formed in the region R1 and the region R2 (R3) other than the region R1 becomes a maximum, an example in which matching of detection signals of respective phase difference detection pixels 52A in two regions which are comparison targets is performed is shown.

However, even when matching of detection signals of respective phase difference detection pixels 52B in two regions which are comparison targets is performed, it is possible to calculate a shift amount in a similar way. Further, even when matching of detection signals of respective imaging pixels 51 in two regions which are comparison targets is performed, it is possible to calculate a shift amount in a similar way.

A case where the matching of the detection signals of the respective imaging pixels 51 in two regions which are comparison targets is performed will be described. In this case, for example, in FIG. 6, when comparing a subject image formed in the region R1 with a subject image formed in the region R2, the matching is performed with respect to detection signals of imaging pixels 51 in a row where the phase difference detection pixels 52A and 52B are not included in the region R1, and detection signals of imaging pixels 51 in a row where the phase difference detection pixels 52A and 52B are not included in the region R2. In this method, since the imaging element has a sensitivity higher than that of the phase difference detection pixel, it is possible to enhance the accuracy of calculation of a shift amount.

Alternatively, the matching may be performed with respect to detection signals of imaging pixels 51 in a row including the phase difference detection pixels 52A or the phase difference detection pixels 52B in the region R1 and detection signals of imaging pixels 51 in a row including the phase difference detection pixels 52A or the phase difference detection pixels 52B in the region R2. In this way, by performing matching with respect to imaging pixels in the same rows as those of phase difference detection pixels, it is possible to further enhance the accuracy of calculation of a shift amount.

In FIG. 6, an example in which a reference region for calculating a shift amount is R1 is described. However, the reference region may sequentially vary.

For example, first, a shift amount Sc is calculated through comparison of subject images in the regions R1 and R2. Then, a shift amount Sd of a subject image R2a in the X direction necessary for maximizing a matching degree of the subject image R2a formed in the region R2 and a subject image R3a formed in the region R3 is calculated through the comparison of the subject images in the regions R2 and R3.

Comparison of the subject images in the region R2 and the region R3 is performed by matching of detection signals of phase difference detection pixels 52A (52B) disposed at positions shifted by the shift amount Sc with respect to phase difference detection pixels 52A and 52B in the region R1 among phase difference detection pixels 52A (52B) disposed in the region R2 and detection signals of all phase difference detection pixels 52A (52B) disposed in the region R3.

Further, the phase difference detection pixels 52A (52B) in the region R2 disposed at the positions shifted by the shift amount Sc in the X direction with respect to the phase difference detection pixels 52A (52B) in the region R1 are set as addition targets of the phase difference detection pixels 52A (52B) in the region R1. Further, the phase difference detection pixels 52A (52B) in the region R3 disposed at the positions shifted by the shift amount Sd in the X direction with respect to the phase difference detection pixels 52A (52B) in the region R2 are set as addition targets of the phase difference detection pixels 52A (52B) in the region R1.

With such a configuration, since subject images are constantly compared in adjacent two regions, it is possible to enhance the reliability of a shift amount.

Figure 9:
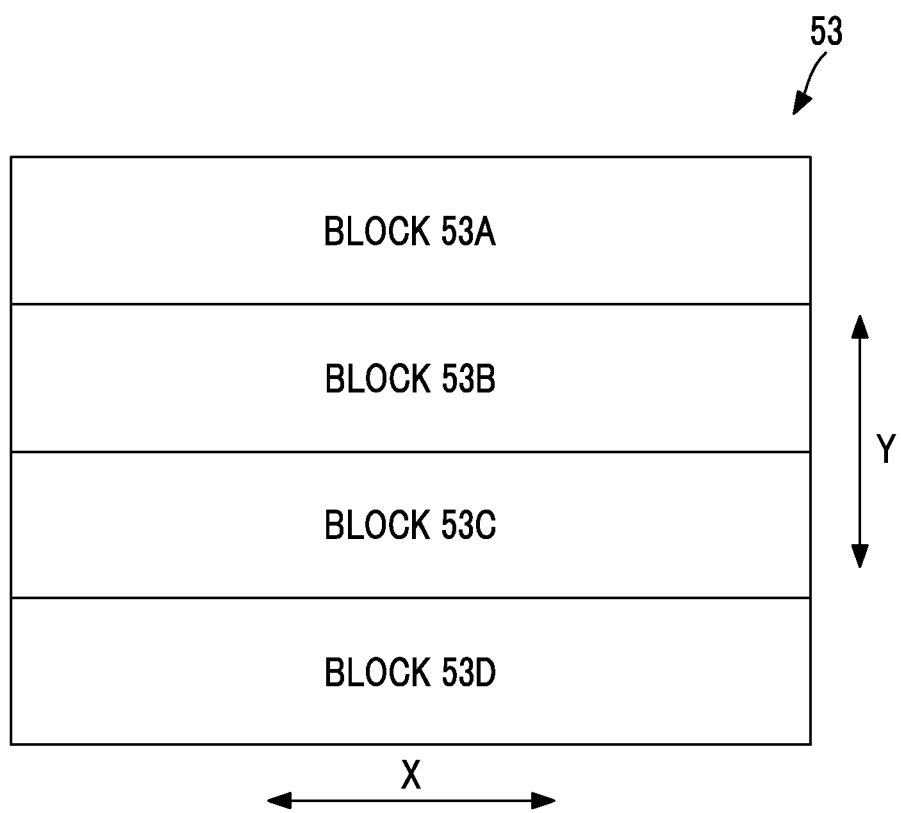
FIG. 9 is a diagram illustrating an example in which an AF area 53 is divided into blocks.

Hereinbefore, the processes of steps S4 to S11 in FIG. 8 are performed with respect to the entirety of the selected AF area 53, but the invention is not limited thereto. For example, as shown in FIG. 9, a selected AF area 53 is divided into blocks in the Y direction (divided into four blocks in the example of FIG. 9). Each of blocks 53A to 53D shown in FIG. 9 may have a configuration in which a region R1 and a region Rj are arranged in the Y direction.

Further, the phase difference AF processing unit 19 performs the processes of steps S4 to S11 for each of the blocks 53A, 53B, 53C, and 53D to generate first defocus amounts Df1, and generates a final second defocus amount Df2 from the generated four first defocus amounts Df1. In this case, the system control unit 11 drives the focus lens according to the second defocus amount Df2.

The second defocus amount Df2 may be an average value of the four first defocus amounts Df1, for example.

With such a configuration, with respect to even a subject having a shape in which the direction of an edge finely varies in the AF area 53, it is possible to secure the accuracy of generation of a defocus amount.

In a configuration in which the AF area 53 is divided into blocks and the first defocus amount Df1 is generated for each block as shown in FIG. 9, the phase difference AF processing unit 19 may determine a block for generation of the first defocus amount Df1 as follows.

ally, the phase difference AF processing unit 19 performs a correlation operation with respect to a detection signal group of the phase difference detection pixels 52A and a detection signal group of the phase difference detection pixels 52B in each of all regions including the region R1 and the region Rj, with respect to an arbitrary block, and generates a third defocus amount Df3 from the result of the correlation operation. Thus, m third defocus amounts Df3 are generated in one block.

The phase difference AF processing unit 19 generates a dispersion of the m third defocus amounts Df3 generated with respect to the arbitrary block. Further, if the dispersion is equal to or larger than a threshold value TH2, the phase difference AF processing unit 19 excludes the block from a generation target of the first defocus amount Df1, and if the dispersion is smaller than the threshold value TH2, the phase difference AF processing unit 19 sets the block as a generation target of the first defocus amount Df1.

As an index indicating the dispersion of the m third defocus amounts Df3, a difference between a maximum value and a minimum value among the m third defocus amounts Df3, a maximum value among differences between the third defocus amounts Df3 generated with respect to adjacent regions R, a dispersion of differences of the third defocus amounts Df3 generated with respect to adjacent regions R, or the like may be calculated.

The phase difference AF processing unit 19 performs the above-described processes with respect to other blocks, and then, performs the processes of steps S4 to S11 only with respect to blocks which are generation targets of the first defocus amounts Df1, to generate the first defocus amounts Df1. Further, the phase difference AF processing unit 19 generates a second defocus amount Df2 from the generated first defocus amounts Df1.

If the dispersion of the m third defocus amounts Df3 generated with respect to the blocks obtained by dividing the AF area 53 is larger, it means that a subject image at a short subject distance and a subject image at a long subject distance are mixed in subject images formed in these blocks. In such a case, if the detection signals of the phase difference detection pixels 52A (52B) are added up as described above, the addition is performed with respect to a subject image at a long subject distance and a subject image at a short subject distance, and thus, the reliability of the generated first defocus amount Df is lowered.

Thus, by calculating the second defocus amount Df2 from the first defocus amount Df1 generated with respect to a block other than a block where a subject image at a long subject distance and a subject image at a short subject distance are mixedly formed, it is possible to enhance the reliability of the second defocus amount Df2.

In the operation example of FIG. 8, the process of step S4 and the subsequent processes are performed when a subject is dark. However, a case where it is necessary to add up detection signals of phase difference detection pixels is not limited to a case where a subject is dark, but also includes a situation where detection signal levels of the phase difference detection pixels 52A and 52B are low.

For example, in a case where an angle of a beam incident onto the imaging element 5 is large so that the intensity of light incident onto the phase difference detection pixels 52A and 52B is small (in wide angle imaging), the process of step S4 and the subsequent processes may be performed. Further, in a case where levels of detection signals of the phase difference detection pixels 52A and 52B are low, the process of step S4 and the subsequent processes may be performed.

Further, the imaging element 5 is not limited to the configurations shown in FIGS. 2 to 5, but may have a configuration in which a plurality of pairs including a first signal detection unit and a second signal detection unit is provided.

For example, a configuration in which all pixels included in the imaging element 5 are used as imaging pixels 51 and each imaging pixel 51 is divided into two parts, in which one divided area is used as a phase difference detection pixel 52A and the other divided area is used as a phase difference detection pixel 52B, may be used.

Figure 10:
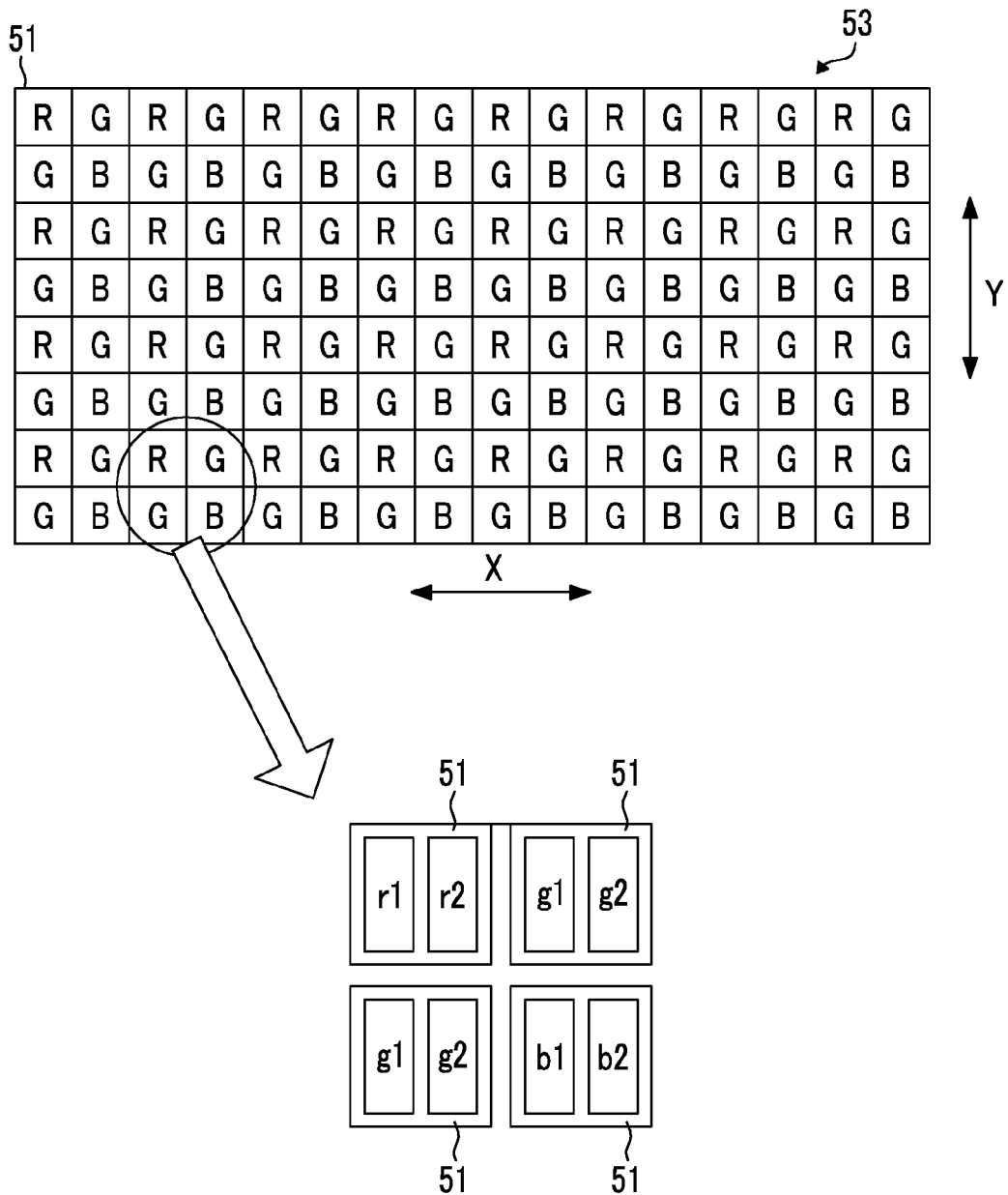
FIG. 10 is a diagram illustrating a modification example of the imaging element 5 shown in FIG. 2.

FIG. 10 is a diagram illustrating a configuration in which all pixels included in the imaging element 5 are used as imaging pixels 51 and each imaging pixel 51 is divided into two parts.

In the configuration of FIG. 10, each imaging pixel 51 with R in the imaging element 5 is divided into two parts, and the divided two parts are used as a phase difference detection pixel r1 and a phase difference detection pixel r2, respectively.

Further, each imaging pixel 51 with G in the imaging element 5 is divided into two parts, and the divided two parts are used as a phase difference detection pixel g1 and a phase difference detection pixel g2, respectively.

Furthermore, each imaging pixel 51 with B in the imaging element 5 is divided into two parts, and the divided two parts are used to as a phase difference detection pixel b1 and a phase difference detection pixel b2, respectively.

In this configuration, the phase difference detection pixels r1, g1, and b1 serve as the first signal detection units, respectively, and the phase difference detection pixels r2, g2, and b2 serve as the second signal detection units, respectively. It is possible to read signals independently from the first signal detection units and the second signal detection units.

Further, if signals of the first signal detection units and the second signal detection units are added up, normal imaging signals are obtained without a phase difference. That is, the imaging pixel 51 functions as a third signal detection unit. In this way, in the configuration of FIG. 6, it is possible to use all pixels as both of phase difference detection pixels and imaging pixels.

In the configuration of FIG. 10, for example, a region including imaging pixels 51 in a first row is referred to as region R1, a region including imaging pixels 51 in a third row is referred to as a region R2, a region including imaging pixels 51 in a fifth row is referred to as a region R3, and a region including imaging pixels 51 in a seventh row is referred to as a region R4.

When calculating a shift amount between the region R1 and the region R2, the shift amount is calculated by performing matching with respect to detection signals of the first signal detection units, detection signals of the second signal detection units, or detection signals of the third signal detection units.

According to this configuration, even when matching is performed using detection signals of phase difference detection pixels, it is possible to minimize sampling intervals in the X direction of two detection signal groups for which the matching is performed. Accordingly, compared with the configurations of the imaging element shown in FIGS. 2 to 5, it is possible to further enhance the accuracy of calculation of a shift amount.

In this embodiment, an example in which the digital camera is used as the imaging device is shown, but hereinafter, an embodiment in which a smart phone with a camera is used as the imaging device will be described.

Figure 11:
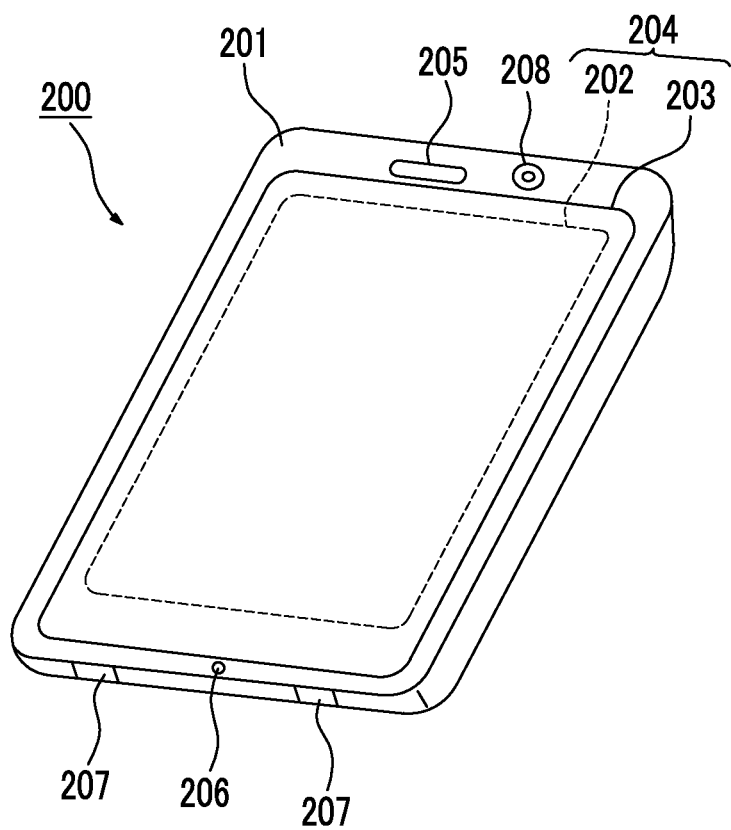
FIG. 11 is a diagram illustrating a smart phone which is an imaging device.

FIG. 11 is a diagram showing an appearance of a smart phone 200 which is an embodiment of the imaging device of the invention. The smart phone 200 shown in FIG. 11 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 12:
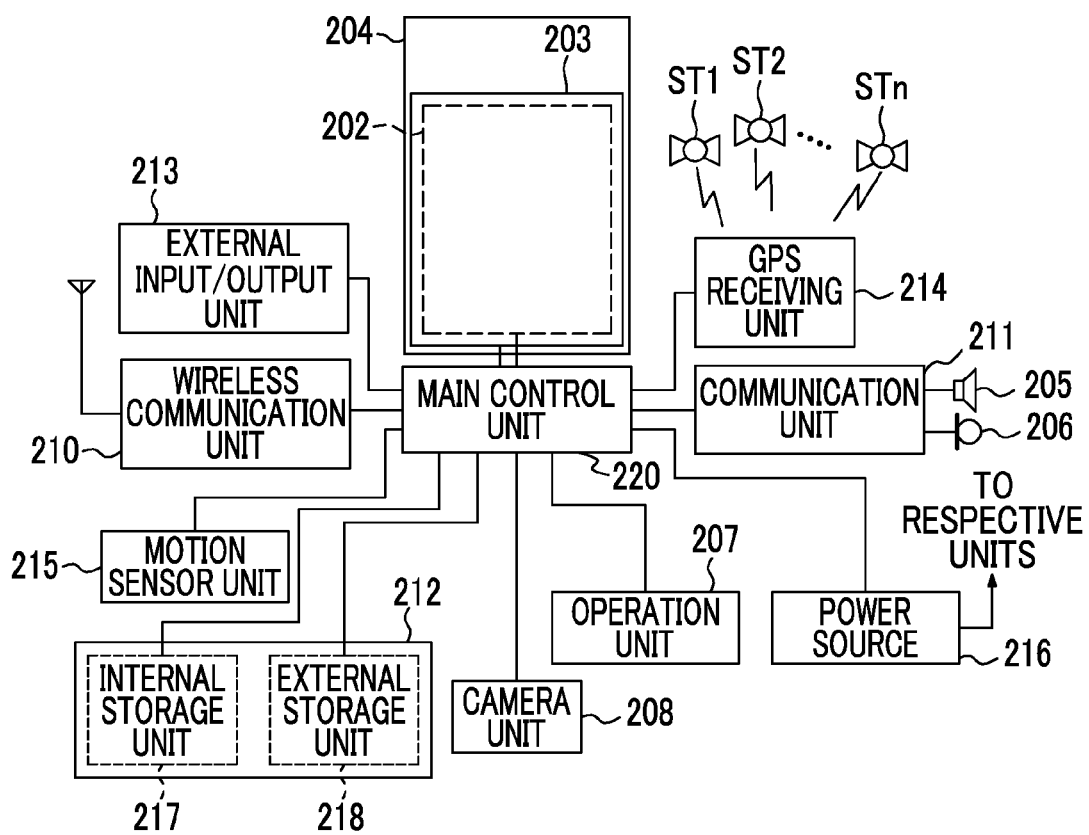
FIG. 12 is an internal block diagram illustrating the smart phone shown in FIG. 11.

FIG. 12 is a block diagram illustrating the configuration of the smart phone 200 shown in FIG. 11. As shown in FIG. 12, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is mounted so that an image displayed on a display surface of the display panel 202 can be visually recognized and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 11, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an inductive coupling type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 11, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 11, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable and attachably memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As an external device to be connected to the smart phone 200, for example, a wired or wireless headset, a wired or wireless external charger, a wired or wireless data port, a memory card, a subscriber identity module (SIM) or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mails, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Furthermore, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

The main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 11, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a static image or a video image, and the result may be recorded in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIG. 8 in the main control unit 220, it is possible to perform a focusing control with high accuracy regardless of subjects even when levels of detection signals of phase difference detection pixels are low.

As described above, this ation discloses the following content.

According to the disclosure, an imaging device includes: an imaging element that includes pairs of a first signal detection unit that detects a signal corresponding to a beam that passes through a divided region among two divided regions of a pupil region divided in a direction in an imaging optical system and a second signal detection unit that detects a signal corresponding to a beam that passes through the other divided region, and includes an imaging surface in which regions where the plurality of first signal detection units and the plurality of second signal detection units that forms pairs in combination with the first signal detection units are arranged in the direction are arranged in a direction orthogonal to the direction; an addition target determination unit that determines, with respect to each of the plurality of first signal detection units in an arbitrary region among the plurality of regions, the first signal detection unit as a detection signal addition target in each region other than the arbitrary region and determines, with respect to the second signal detection unit that forms a pair in combination with each of the plurality of first signal detection units, the second signal detection unit as a detection signal addition target in each region other than the arbitrary region through comparison of subject images formed in the plurality of respective regions; a defocus amount generation unit that performs a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generates a first defocus amount from a result of the correlation operation; and a focusing control unit that performs a focusing control for the imaging optical system based on the first defocus amount.

In the disclosed imaging device, the addition target determination unit may calculate a shift amount in the direction of a first subject image formed in the arbitrary region necessary for maximizing a matching degree of the first subject image and a second subject image formed in each region other than the arbitrary region, for each region other than the arbitrary region, and may determine a first signal detection unit disposed at a position shifted by the shift amount calculated for each region other than the arbitrary region with respect to each of the plurality of first signal detection units in the arbitrary region as the addition target and may determine a second signal detection unit disposed at a position shifted by the shift amount with respect to each of the plurality of second signal detection units in the arbitrary region as the addition target, among the first signal detection units and the second signal detection units in each region other than the arbitrary region.

In the disclosed imaging device, the addition target determination unit may exclude the first signal detection units and the second signal detection units in the region where the shift amount is equal to or greater than a first threshold value from the addition target.

In the disclosed imaging device, the addition target determination unit may perform the comparison of the subject images formed in the plurality of respective regions by matching of detection signals of the first signal detection units or the second signal detection units in the plurality of respective regions.

In the disclosed imaging device, a third signal detection unit that may detect a signal corresponding to a beam that passes through the two divided regions is further provided in the region, and the addition target determination unit may perform the comparison of the subject images formed in the plurality of respective regions by matching of detection signals of the third signal detection units in the plurality of respective regions.

In the disclosed imaging device, the addition target determination unit may perform the comparison of the subject images formed in the plurality of respective regions by matching of detection signals of the third signal detection units present in the same rows as those of the first signal detection units or the second signal detection units in the plurality of respective regions.

In the disclosed imaging device, the pair in the region may function as a third signal detection unit that detects a signal corresponding to a beam that passes through the two divided regions by addition of detection signals, and the addition target determination unit may perform the comparison of the subject images formed in the plurality of respective regions by matching of detection signals obtained by adding up detection signals of the first signal detection units and detection signals of the second signal detection units in the respective pairs in the plurality of respective regions.

In the disclosed imaging device, the addition target determination unit may determine, when the imaging surface is divided into blocks each of which includes the plurality of regions, the addition target for each block, the defocus amount generation unit may generate the first defocus amounts for each block, and generates a second defocus amount from the first defocus amounts generated for each block, and the focusing control unit may perform the focusing control for the imaging optical system according to the second defocus amount.

In the disclosed imaging device, the defocus amount generation unit may perform a correlation operation with respect to detection signals of the first signal detection units and detection signals of the second signal detection units, output from the plurality of pairs, in each of the plurality of regions included in the block, may generate a third defocus amount from a result of the correlation operation, and may generate the second defocus amount from the first defocus amounts generated with respect to a block other than a block in which a distribution of the third defocus amounts generated in the plurality of respective regions is equal to or greater than a second threshold value.

According to the disclosure, a focusing control method of an imaging device including an imaging element that includes pairs of a first signal detection unit that detects a signal corresponding to a beam that passes through a divided region among two divided regions of a pupil region divided in a direction in an imaging optical system and a second signal detection unit that detects a signal corresponding to a beam that passes through the other divided region, includes an imaging surface in which regions where the plurality of first signal detection units and the plurality of second signal detection units that forms pairs in combination with the first signal detection units are arranged in the direction are arranged in a direction orthogonal to the direction, and images a subject through the imaging optical system, includes: an addition target determination step of determining, with respect to each of the plurality of first signal detection units in an arbitrary region among the plurality of regions, the first signal detection unit as a detection signal addition target in each region other than the arbitrary region and determining, with respect to the second signal detection unit that forms a pair in combination with each of the plurality of first signal detection units, the second signal detection unit as a detection signal addition target in each region other than the arbitrary region, through comparison of subject images formed in the plurality of respective regions; a defocus amount generation step of performing a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generating a first defocus amount from a result of the correlation operation; and a focusing control step of performing a focusing control for the imaging optical system based on the first defocus amount.

INDUSTRIAL APPLICABILITY

The present invention is applied to a digital camera or the like to provide high convenience and effectiveness.

EXPLANATION OF REFERENCES

1: imaging lens
2: diaphragm
5: imaging element
11: system control unit (focusing control unit)
19: phase difference AF processing unit (defocus amount generation unit, addition target determination unit)
50: imaging surface
51: imaging pixel (third signal detection unit)
52A, 52B: phase difference detection pixel (first signal detection unit, second signal detection unit)
53: AF area
53A, 53B, 53C, 53D: block

What is claimed is:

1. An imaging device comprising:
an imaging element that includes pairs of a first signal detection unit that detects a signal corresponding to a beam that passes through a divided region among two divided regions of a pupil region divided in a direction in an imaging optical system and a second signal detection unit that detects a signal corresponding to a beam that passes through the other divided region, and includes an imaging surface in which regions where the plurality of first signal detection units and the plurality of second signal detection units that forms pairs in combination with the first signal detection units are arranged in the direction are arranged in a direction orthogonal to the direction;
a processing circuitry configured to:
determine, with respect to each of the plurality of first signal detection units in an arbitrary region among the plurality of regions, arranged in the direction orthogonal to the direction, the first signal detection unit as a detection signal addition target in each region other than the arbitrary region and determine, with respect to the second signal detection unit that forms a pair in combination with each of the plurality of first signal detection units, the second signal detection unit as a detection signal addition target in each region other than the arbitrary region, through comparison of subject images formed in the plurality of respective regions, wherein the processing circuitry is further configured to calculate a shift amount in the direction of a first subject image formed in the arbitrary region necessary for maximizing a matching degree of the first subject image and a second subject image formed in each region other than the arbitrary region, for each region other than the arbitrary region, determine a first signal detection unit disposed at a position shifted by the shift amount calculated for the each region with respect to each of the plurality of first signal detection units in the arbitrary region as the addition target, and determine a second signal detection unit disposed at a position shifted by the shift amount with respect to each of the plurality of second signal detection units in the arbitrary region as the addition target, among the first signal detection units and the second signal detection units in each region other than the arbitrary region;
perform a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generate a first defocus amount from a result of the correlation operation; and
perform a focusing control for the imaging optical system based on the first defocus amount.

2. The imaging device according to claim 1,
wherein the processing circuitry is further configured to exclude the first signal detection units and the second signal detection units in the region where the shift amount is equal to or greater than a first threshold value from the addition target.

3. The imaging device according to claim 1,
wherein the processing circuitry is further configured to perform the comparison of the subject images formed in the plurality of respective regions by matching of detection signals of the first signal detection units or the second signal detection units in the plurality of respective regions.

4. The imaging device according to claim 2,
wherein the processing circuitry is further configured to perform the comparison of the subject images formed in the plurality of respective regions by matching of detection signals of the first signal detection units or the second signal detection units in the plurality of respective regions.

5. The imaging device according to claim 1,
wherein a third signal detection unit that detects a signal corresponding to a beam that passes through the two divided regions is further provided in the region, and
wherein the processing circuitry is further configured to perform the comparison of the subject images formed in the plurality of respective regions by matching of detection signals of the third signal detection units in the plurality of respective regions.

6. The imaging device according to claim 2,
wherein a third signal detection unit that detects a signal corresponding to a beam that passes through the two divided regions is further provided in the region, and
wherein the processing circuitry is further configured to perform the comparison of the subject images formed in the plurality of respective regions by matching of detection signals of the third signal detection units in the plurality of respective regions.

7. The imaging device according to claim 5,
wherein the processing circuitry is further configured to perform the comparison of the subject images formed in the plurality of respective regions by matching of detection signals of the third signal detection units present in the same rows as those of the first signal detection units or the second signal detection units in the plurality of respective regions.

8. The imaging device according to claim 6,
wherein the processing circuitry is further configured to perform the comparison of the subject images formed in the plurality of respective regions by matching of detection signals of the third signal detection units present in the same rows as those of the first signal detection units or the second signal detection units in the plurality of respective regions.

9. The imaging device according to claim 1,
wherein the pair in the region functions as a third signal detection unit that detects a signal corresponding to a beam that passes through the two divided regions by addition of detection signals, and
wherein the processing circuitry is further configured to perform the comparison of the subject images formed in the plurality of respective regions by matching of detection signals obtained by adding up detection signals of the first signal detection units and detection signals of the second signal detection units in the respective pairs in the plurality of respective regions.

10. The imaging device according to claim 2,
wherein the pair in the region functions as a third signal detection unit that detects a signal corresponding to a beam that passes through the two divided regions by addition of detection signals, and
wherein the processing circuitry is further configured to perform the comparison of the subject images formed in the plurality of respective regions by matching of detection signals obtained by adding up detection signals of the first signal detection units and detection signals of the second signal detection units in the respective pairs in the plurality of respective regions.

11. The imaging device according to claim 1,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

12. The imaging device according to claim 2,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

13. The imaging device according to claim 3,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

14. The imaging device according to claim 4,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

15. The imaging device according to claim 5,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

16. The imaging device according to claim 6,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

17. The imaging device according to claim 7,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

18. The imaging device according to claim 8,
wherein the processing circuitry is further configured to:
determine, when the imaging surface is divided into blocks each of which includes the plurality of regions, the addition target for each block,
generate the first defocus amounts for each block, and generate a second defocus amount from the first defocus amounts generated for each block, and
perform the focusing control for the imaging optical system according to the second defocus amount.

19. The imaging device according to claim 11,
wherein the processing circuitry is further configured to perform a correlation operation with respect to detection signals of the first signal detection units and detection signals of the second signal detection units, output from the plurality of pairs, in each of the plurality of regions included in the block, generate a third defocus amount from a result of the correlation operation, and generate the second defocus amount from the first defocus amounts generated with respect to a block other than a block in which a distribution of the third defocus amounts generated in the plurality of respective regions is equal to or greater than a second threshold value.

20. A focusing control method comprising:
an addition target determination step of determining, with respect to each of a plurality of first signal detection units in an arbitrary region among a plurality of regions, arranged in a direction orthogonal to a direction in which pairs of a first signal detection unit that detects a signal corresponding to a beam that passes through a divided region among two divided regions of a pupil region are divided, the first signal detection unit as a detection signal addition target in each region other than an arbitrary region and determining, with respect to a second signal detection unit that forms a pair in combination with each of the plurality of first signal detection units, the second signal detection unit as a detection signal addition target in each region other than the arbitrary region, through comparison of subject images formed in a plurality of respective regions, wherein the addition target determination step includes calculating a shift amount in a direction of a first subject image formed in the arbitrary region necessary for maximizing a matching degree of the first subject image and a second subject image formed in each region other than the arbitrary region, for each region other than the arbitrary region, determines a first signal detection unit disposed at a position shifted by a shift amount calculated for the each region with respect to each of the plurality of first signal detection units in the arbitrary region as the addition target, and determines a second signal detection unit disposed at a position shifted by the shift amount with respect to each of the plurality of second signal detection units in the arbitrary region as the addition target, among the first signal detection units and the second signal detection units in each region other than the arbitrary region;
a defocus amount generation step of performing a correlation operation with respect to a detection signal group obtained by adding up a detection signal of each of the plurality of first signal detection units in the arbitrary region and a detection signal of the first signal detection unit determined as the addition target with respect to each of the former first signal detection units and a detection signal group obtained by adding up a detection signal of each of the plurality of second signal detection units in the arbitrary region and a detection signal of the second signal detection unit determined as the addition target with respect to each of the former second signal detection units, and generating a first defocus amount from a result of the correlation operation; and
a focusing control step of performing a focusing control for an imaging optical system based on the first defocus amount.

* * * * *